United States Patent [19]

Buechler

[11] 4,451,856

[45] May 29, 1984

[54] ENGRAVING AND SCANNING APPARATUS

[75] Inventor: Lester W. Buechler, Dayton, Ohio

[73] Assignee: Ohio Electronic Engravers, Inc., Dayton, Ohio

[21] Appl. No.: 422,653

[22] Filed: Sep. 24, 1982

Related U.S. Application Data

[62] Division of Ser. No. 56,623, Jul. 11, 1979, Pat. No. 4,357,653.

[51] Int. Cl.³ .............................................. H04N 1/24
[52] U.S. Cl. .................................... 358/299; 358/292; 358/294
[58] Field of Search ...................... 358/299, 294, 292; 101/1

[56] References Cited

U.S. PATENT DOCUMENTS

| | | | |
|---|---|---|---|
| 2,575,546 | 11/1951 | Boyajean | 358/299 |
| 2,925,464 | 2/1960 | Raible | 358/299 |
| 3,684,889 | 8/1972 | Priessnetz | 358/294 |
| 3,964,382 | 6/1976 | Baar | 358/299 |
| 4,013,831 | 3/1977 | Dölves | 358/299 |
| 4,160,280 | 7/1979 | Atoji | 358/294 |

Primary Examiner—Howard W. Britton
Attorney, Agent, or Firm—Jacox & Meckstroth

[57] ABSTRACT

An engraving head incorporates a shaft which is supported for high frequency oscillation by axially spaced metal spring elements, and the shaft is acted upon by improved dampening means to minimize undesirable transverse and transient vibrations. A diamond cutting stylus is carried by a holder mounted within an arm projecting from the shaft by means which facilitates convenient removal and resharpening of the stylus. A diamond guide shoe has a flat face which engages the surface to be engraved adjacent the stylus and is supported by means which may be conveniently adjusted without rotation to obtain precision alignment of the face with the surface. A diamond deburring or shaving element has a shearing edge adjacent the stylus and is also supported for convenient angular adjustment to obtain precise alignment. The entire engraving head is pivotally supported by leaf springs and is raised and lowered by power operated means. The apparatus also incorporates a scanning head including an improved optical system for precisely and effectively illuminating and detecting the copy to be engraved. The apparatus further includes a control system which automatically corrects and compensates for unbalance in copy density at repeated lengths on the copy, and the engraver shaft drive is controlled to produce a flat frequency response which passes through the resonant frequency of the oscillating components.

7 Claims, 14 Drawing Figures

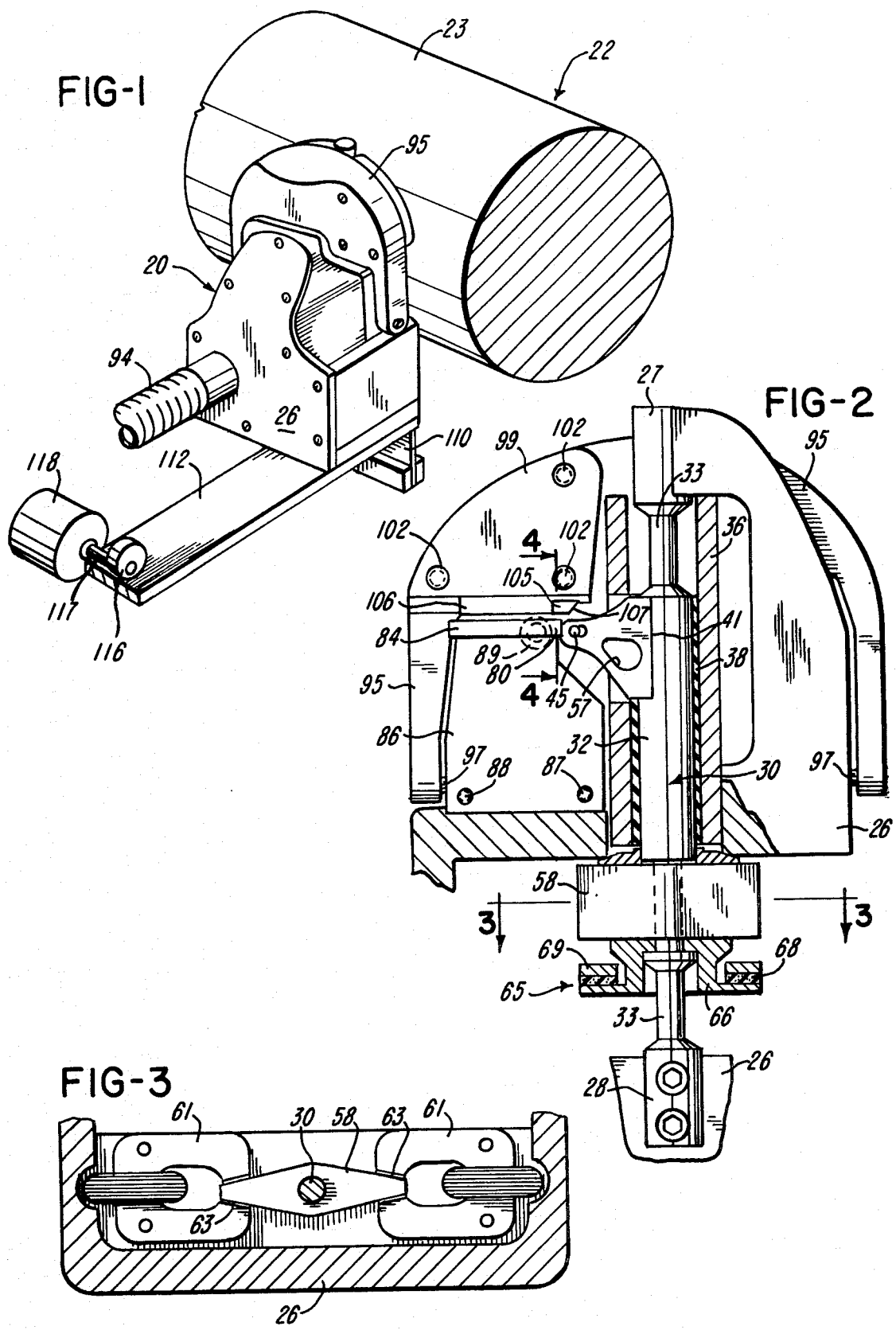

ENGRAVING AND SCANNING APPARATUS

This application is a division of Ser. No. 56,623 filed July 11, 1979, now U.S. Pat. No. 4,357,653.

BACKGROUND OF THE INVENTION

This invention relates to the engraving of cylinders commonly used in the gravure printing process, and specifically to engraving apparatus of the general type disclosed, for example, in U.S. Pat. Nos. 2,881,246, 2,874,479, 3,964,382 and 4,013,829. The basic principle of electro-mechanical engraving of a gravure cylinder involves rotating a copper plated cylinder while actuating an electrically driven tool which cuts or engraves cells or lines into the copper surface. The engraved cylinder is normally used in a web type gravure printing press for printing paper, plastic, or metallic film material.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within one to two microns of the desired theoretical location. The depth of the engraved cells must also be accurately controlled since the the depth determines the amount of ink transferred which, in turn, determines the shade of gray in a black-white print. In a color print, the amount of ink transferred to the paper or material is even more critical since three colors are mixed to produce various shades of all possible colors. A slight variation in the desired amount of ink effects not only the darkness of the color but, more importantly, the production of the desired color tone.

In addition to printing newspapers and magazines, the engraved cylinders may also be used for direct or indirect printing of cloth, applying glue, printing of packaging materials for products, and printing of wood grain patterns for making of wall paneling, floor coverings and other surface coverings.

The cutting tool used to engrave the cells is normally a pointed diamond stylus. Other tools made of sapphire, carbide, cobalt steel, etc. may also be used, but generally give shorter life, and due to wear, do not hold as consistent a point as diamond. The tool must make many cells in a cylinder, and therefore, must be operated at a very high speed. For example, in a typical 140 line screen, about 20,000 cells per square inch are required. More than 100 million cells are frequently required for a single large diameter gravure printing cylinder. Even with a forming rate of 3,000 to 4,000 cells per second, several hours of time may be required to engrave a single cylinder. Such a high cell forming rate introduces serious problems of high acceleration forces with resulting torsional and transverse or lateral vibrations. It is also necessary to make rapid transfer from black to white (full cells to no cells) or white to black. This also introduces transients causing serious torsional and transverse vibrations.

In the engraving of a gravure cylinder, the image pattern or copy to be engraved is usually mounted on a copy cylinder, and the copy is optically scanned while the engraving is being performed. However, the copy may be scanned and the corresponding information stored in computer memory, processed, and later used to engrave a cylinder. The engraving machine may be an electro-mechanical engraver which uses a diamond stylus to engrave the cylinder, or the machine may incorporate electronic means such as electron beam or laser for forming the cells within the cylinder. In either machine, a series of cavities and/or lines are engraved into the cylinder surface. The cavities are adapted to carry ink which produces the image on the material being printed. The image may involve either very small images such as printing type requiring very small and well defined lines or pictures requiring very close control of different cylinders for different colored inks needed for close color matching or large images for printing items such as wallpaper.

In electro-mechanical engraving apparatus, there are a number of specific problems. For example, there is a strong tendency for the mechanical stylus holder and its spring support system to "ring" or vibrate rotationally thereby producing "ghost" images which are displaced from the main image. This greatly reduces the quality of the printing, especially of small type, and dampening means must be used in a form which does not introduce hystersis. The cost of sharpening the diamond engraving stylus is also very high due to the necessity for removing the stylus from its holder in order to grind the cutting surfaces.

There are also problems presented by the bearing or bearings commonly used to support the actuating shaft which carries the cutting tool. A bearing introduces friction, unpredictable hysteresis, and uncontrollable lateral or transverse movement of the cutting tool due to bearing looseness. Even with high strength connections between the power actuated driver and the cutting tool, harmonic vibrations are generally present in the coupling shaft and must be avoided or minimized to produce accurate placement of the cells as well as cells with precisely controlled depths. The stylus holder should also be constructed so that the cutting tool or stylus may be conveniently replaced and precisely aligned without extensive adjustment procedures.

Presently used electro-mechanical engraver systems commonly use a round or ball surface on the diamond guide shoe and thereby avoid the need for precision alignment of the shoe. However, when a round shoe surface passes over a deep engraving, the shoe presses into the copper surface and reduces the quality of the first engraving. While it is necessary for the diamond shoe to be adjustable, the adjustment in presently used machines is provided by mounting the diamond shoe on the end of a fine pitch screw. As a ball point diamond wears, it takes on a slight concaved shape. Thus when the diamond shoe support screw is rotated for adjustment, two lines are drawn on the cylindrical copper surface of the gravure cylinder. These double lines are very undesirable as they may carry ink and appear in the copy printed by the engraved cylinder.

Another problem is presented by the engraving operation producing copper chips which are always present in the vicinity of the cutting stylus and the sliding guide shoe. When these chips pass under the shoe, the shoe and engraving head are forced upwardly causing a lesser depth row of cells and, in turn, a line in the final printed material which may be from a fraction of an inch in length to several inches in length. While forced air is often used to clear chips, further means are desirable to avoid chips passing under the guide shoe.

In the scanning of the image of the copy on the scanning side of the engraving system, there is a problem of obtaining the same reading from a white area surrounded by a dark area as from an equally white area where the whole area is white. This is commonly referred to as light tunneling in the copy material. Light enters the paper or photographic copy material, is transmitted laterally in the copy material, and some of the light extends a small fraction of an inch from where it enters. It is not uncommon to have a reading from a small white spot surrounded by black which is 20 to 40% less than the reading from an equally white spot in a white area. Since this reading controls the engraving depth, it is a serious problem in many copy materials. To avoid this problem, it is desirable to have the illumination spot of light as near as possible to the size of the spot being read.

Since the copy material on the copy support cylinder is not always of uniform thickness and/or may contain wrinkles, it is necessary that the illumination and pickup system have a good depth of focus. The pickup or reading system normally has a good depth of focus, for example, 1/6 inch, by having a high f lens number such as f8 to f22. However, since the illumination must come in at a large angle, i.e., 20 to 60 degrees, to avoid direct surface reflections, the illumination effectively comes from a lens with low f numbers such as f1 to f2. It is difficult to obtain a good depth of focus with such an illumination spot.

Presently used electro-mechanical engravers provide for manually raising and lowering the engraving head relative to the cylinder being engraved. However, if the head is not lowered carefully, the diamond stylus may be damaged, and such damage will not become apparent until after engraving the cylinder, resulting in a defective or damaged cylinder. Also in the "step and repeat" process of engraving a cylinder after each engraving "step", there is a period of no engraving while the scanner is being returned to the start position. If the engraving head is not raised during the time of no engraving, the guide shoe of the engraver runs in a single track around the cylinder and may damage the cylinder surface.

SUMMARY OF THE INVENTION

The present invention is directed to improved apparatus and method for electro-mechanically engraving printing plates or cylinders and which provides for effectively solving the above defined problems and for making electro-mechanical engraving of gravure printing cylinders more competitive with chemical engraving of the cylinders.

More specifically, the apparatus and method of the invention provide for minimizing the transverse or lateral vibrations within the engraving stylus holder so that the engraved cylinder produces higher quality printing. The invention also provides for conveniently removing the holder for the diamond engraving stylus and for regrinding or sharpening the stylus while it remains on the holder, thereby simplifying the regrinding operation and minimizing the downtime of the engraving machine. The apparatus of the invention also eliminates the use of one or more bearings for supporting the stylus holder shaft and thereby eliminates the problems associated with such bearings.

As will also become apparent, the apparatus of the invention provides a guide shoe which has a flat face for engaging the cylinder surface and a lead edge which prevents chips from passing between the guide shoe and the cylinder surface. The apparatus also provides for precisely and conveniently adjusting the cutting stylus, the guide shoe and a cleaning shoe relative to the cylinder surface, and for automatically raising and lowering the engraving head at a controlled rate which avoids the possibility of damaging the cylinder surface. In addition, the invention provides a copy scanner with a combined lens and illumination system which assures more accurate scanning or reading of the copy material.

While the invention is illustrated and described in reference to the engraving of a gravure printing cylinder, the apparatus of the invention may also be used for engraving flat printing plates, and for which either the engraving head or the flat plate is movable. Furthermore, other features and advantages of the invention will be apparent from the following description, the accompanying drawings and the appended claims.

BRIEF DESCRIPTION OF THE DRAWINGS

FIG. 1 is a perspective view of an electro-mechanical engraving head constructed in accordance with the invention and illustrating its engraving position relative to a cylinder positioned to be engraved;

FIG. 2 is an elevational view of the front face of the engraving head and showing a portion in section to illustrate internal assembly;

FIG. 3 is a fragmentary section taken generally on the line 3—3 and showing a portion of the electro-magnetic drive system within the printing head;

DESCRIPTION OF THE PREFERRED EMBODIMENTS

Figure 4:
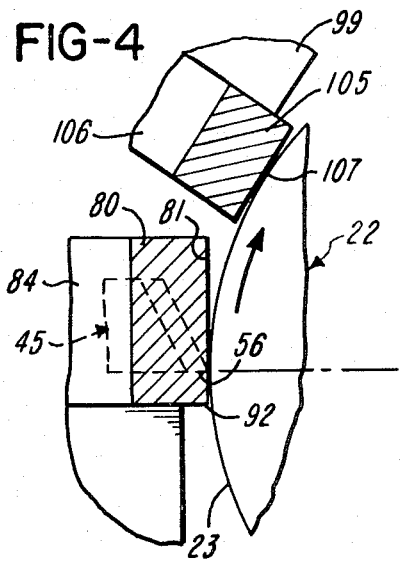
FIG. 4 is an enlarged diagrammatic view illustrating the relative positions of the diamond guide shoe, diamond cutting stylus and the diamond cleaning or deburring element.

FIG. 1 shows an engraving head 20 constructed in accordance with the invention and in position for engraving a gravure printing cylinder 22 having a copper coating forming an outer surface 23. The engraving head 20 preferably includes a cast metal housing 26 which rigidly supports opposite end portions 27 and 28 (FIG. 2) of a shaft 30. The shaft 30 includes an intermediate portion 32 which is integrally connected to the end portions 27 and 28 by torsional spring portions 33 of reduced diameter. The intermediate shaft portion 32 extends through a tubular sleeve 36, and an intermediate liner of resilient material 38, such as silicone rubber, is bonded to the intermediate shaft portion 32 and the sleeve 36 for supporting the shaft 32 to avoid any lateral movement or vibration.

Figure 5:
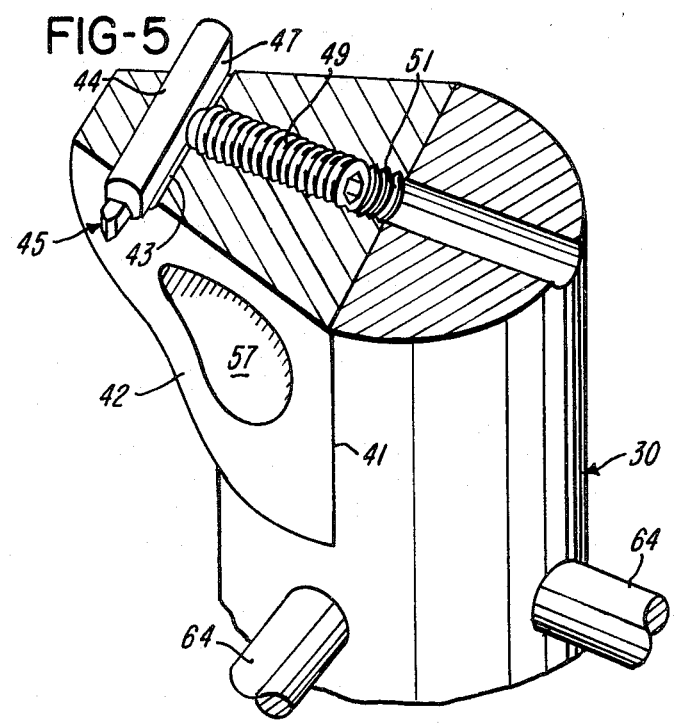
FIG. 5 is a fragmentary perspective view in part-section of the cutting stylus support assembly and also illustrating a modified form for supporting the stylus actuating shaft.
Figure 6:
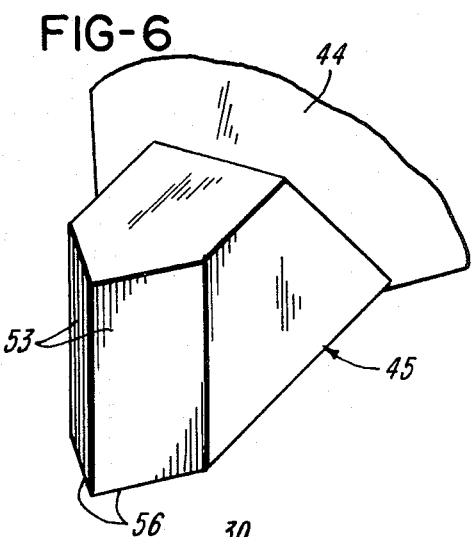
FIG. 6 is an enlarged perspective view of the diamond cutting stylus shown in FIG. 5 and projecting from its holder.

A notch 41 is formed within the shaft portion 32 and supports an actuator arm 42 which is rigidly secured to the shaft portion 32 by a set of screws. A cylindrical transverse hole 43 (FIG. 5) is formed within the actuator arm 42, and an elongated rod-like holder 44 is disposed within the hole 43. A cutting stylus 45, preferably formed of diamond, is cemented into one end of the holder 44 which has a flat surface 47. The surface 47 is engaged by a screw 49 which is threaded into a hole 51 extending outwardly from the shaft 32 through the actuator arm 42 and intersecting the hole 43. As shown in FIG. 6, the diamond stylus 45 includes angularly related flat surfaces 53 which cooperate with a bottom flat surface to form V-shaped cutting edges 56. The actuator arm 42 has a hole 57 which aids in reducing the mass of the arm and in obtaining a desired air flow across the stylus for removing chips.

Referring to FIGS. 2 and 3, an armature 58 is rigidly secured to the shaft 32 and projects outwardly between a pair of opposing electro-magnets 61 which are mounted within the base portion of the housing 26 and cooperate with the armature 58 to define air gaps 63. When the magnets 61 are energized by an alternating current, the intermediate shaft portion 32 and actuator arm 42 oscillate through a maximum arc of approximately 0.25 degree and at a frequency preferably between 3,000 and 5,000 cycles per second. This oscillation results in vibrating or moving the cutting stylus 45 by a maximum distance of about 100 microns.

The length and the stiffness of the torsional spring portions 33 of the shaft 32 are selected to provide the entire oscillating assembly with a predetermined rotational stiffness, preferably having a natural frequency of 2,000 to 3,000 cycles per second. It has been found desirable for the operating frequency to be significantly greater than the natural frequency of the oscillating assembly in order to prevent a high resonant rise at the operating frequency, and thereby provide for more precise control of the vibratory movement of the cutting stylus. In addition, factors such as the operating temperature, the hardness of the copper coating 23, the sharpness of the cutting stylus 25, etc. have more affect on the control of the movement of the cutting stylus and the depth of the engraved cells in a system with a high resonant rise.

As mentioned above, the layer 38 of resilient material connecting the shaft portion 32 to the rigid sleeve 36 provides the oscillating assembly with a lateral stiffness which effectively presents lateral vibrations. In addition to these vibrations within the shaft 30 caused by the reaction of the cutting stylus 45 against the copper surface 23, there are also vibrations of the fundamental mode. To minimize such vibrations, the intermediate shaft portion 32 may also be supported with intermediate support rods 64 (FIG. 5) which are rigidly connected to the shaft 32 at right angles and are also rigidly connected to the housing 26. The rods 64 provide the shaft 30 with high lateral stiffness in X-Y directions while also providing for high frequency oscillation of the shaft. The support rods 64 substantially eliminate the friction which would be produced by an intermediate support bearing and also minimize hysteresis which results in irregular, unpredictable motion of the cutting stylus 45.

It has been found that the support rods 64 should be of good steel spring material, having a cross-sectional area of about 0.02 square inch and a length of about 0.5 inch in order to provide the desired stiffness and flexibility without fatigue. While two support rods 64 are illustrated in FIG. 5, it is apparent that additional sets of support rods may also be used and, if desired, the torsional spring support portions 33 at opposite ends of the shaft may be replaced by corresponding sets of support rods 64. When the elastic, essentially non-compressible material 38 is used to provide the shaft 30 with a high degree of lateral stiffness, substantially all of the oscillatory assembly is preferably encompassed with the material to cover as large an area as possible and thereby provide the maximum lateral stiffness.

Referring again to FIGS. 2 and 7, undesirable transverse and rotational vibrations in the oscillating assembly are also reduced by a dampener 65 which includes a metal hub member 66 mounted on the shaft 30 between the armature 58 and lower spring portion 33. A set of arcuate pads 68 of resilient, non-compressible material is bonded to the hub member 66 at circumferentially spaced intervals, and a corresponding set of arcuate weight or mass elements 69 are bounded to the pads 68 so that the elements 69 are free for limited movement relative to the shaft 30 and also relative to the housing 26 of the engraving head.

The arrangement of the pads 68 and elements 69 provides for absorbing energy without introducing undesirable hysteresis as would result if the resilient pads 68 were also bonded directly to the support housing 26. Such hysteresis causes both short and long term drifts in the depth of the cells which are engraved, and it may take several seconds for the hysteresis effects to disappear. The spring constant of the combined elastic pads 68 and weight elements 69 may be selected so that the resonant or natural frequency is approximately the same as the resonant or natural frequency of the shaft assembly.

Figure 7:
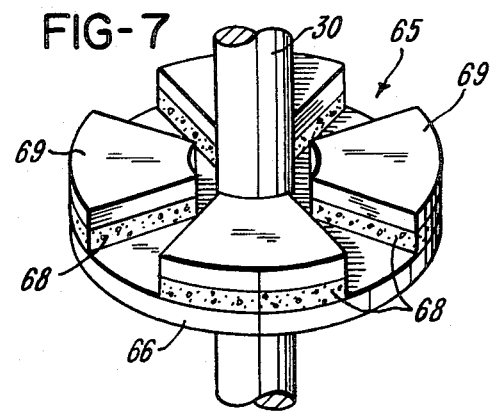
FIG. 7 is a perspective illustration of a system for dampening vibrations in the stylus support shaft.

The frequency to be dampened by the dampener 65 shown in FIG. 7 is primarily a single frequency established by the inertia of the oscillating assembly working against the torsional spring forces produced by the shaft portions 33. Generally this frequency is about 2,000 to 3,000 cycles per second, but may be readily varied by changing the spring constant or mass element 69. Since the weight or mass elements 69 move about 180 degrees out of phase with respect to the hub member 66 and at a greater amplitude, they absorb more energy for a given area of dampening material than would the material if it was also bonded to a large mass or directly between 66 and the housing.

Figure 8:
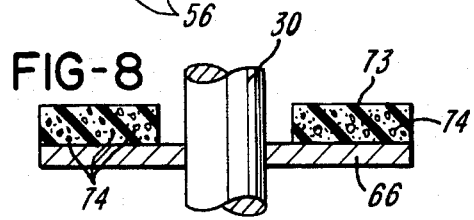
FIGS. 8–10 are axial sections diagrammatically illustrating modified dampening systems constructed in accordance with the invention.
Figure 9:
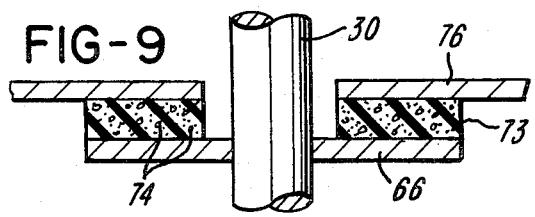
Figure 10:
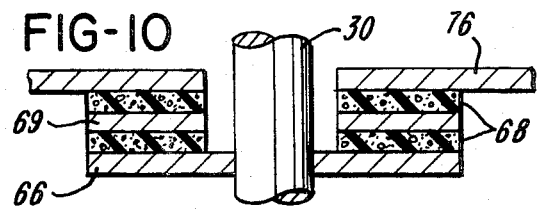

FIGS. 8–10 illustrate diagrammatically different modifications of dampeners which are also constructed in accordance with the invention. In each modification, it is desirable for the elastical or resilient elements and mass elements to be uniformly arranged around the shaft to avoid translational forces being introduced to the shaft, but it is not necessary for the elements to be in the form of a continuous ring. In the modification shown in FIG. 8, the dampener includes a set of arcuate pads 73 which are bonded to the hub member 66 and are formed of a resilient material having embedded therein heavier particles 74 such as lead shot. The mass particles 74 act in the same manner as the mass elements 69 towards dampening undesirable lateral and rotational vibrations.

In the modification illustrated in FIG. 9, the pads 73 are also attached or bonded to a stationary plate 76 which is rigidly secured to the housing 26 of the engraving head. The attachment of the pads 73 to the housing with a dampening material reduces the resonant rise of "Q" of the spring-mass system. The pads 73 may be made with a soft attachment to plates 76 to minimize hysteresis in the oscillating components or assembly of the engraving head. In FIG. 10, the mass elements 69 of the dampener 65 are attached to the housing plate 76 through another set of resilient pads or elements 68 and forms a dampener which functions in the same manner as the dampener shown in FIG. 9.

Referring to FIG. 2, a guide shoe 80 is preferably formed of diamond and has a flat face 81 (FIG. 4) which engages the copper surface 23 of the cylinder 22 to be engraved. The guide shoe 80 is cemented or secured to an elongated bar 84 which is secured to the upper portion of a plate 86. The plate 86 is secured to the housing 26 by a three point adjustable mounting which includes a screw 87 adapted to provide for slight pivoting or tilting of the plate 86. A set of adjustment screws 88 and 89 provide for adjusting or tilting the plate 86 about the connecting screw 87 so that the flat surface 81 of the shoe 80 may be precisely aligned parallel with the axis of the cylinder 22. The guide shoe 80 is positioned (FIG. 4) so that its leading edge 92 is spaced closely to the cylinder surface 23, for example, within one to three microns, so that the chips produced during engraving by the stylus 45 do not pass between the face 81 of the guide shoe 80 and the cylinder surface 23 and result in raising the shoe and stylus. As shown in FIG. 1, a suction hose 94 is connected to an opening within the back wall of the housing 26 for removing the chips from the stylus 45 and actuator arm 42 as the chips are produced. Commonly, the chips are from three to fifty microns in size.

An inverted U-shaped yoke member 95 (FIGS. 1 and 2) is pivotally connected to the housing 26 at pivot pins 97 and carries a generally triangular plate 99 which is secured to the yoke member 95 by a three point mounting formed by a set of adjustment and locking screws 102. A diamond cleaning or scraping shoe 105 is mounted or cemented to an elongated bar 106 which is secured to the plate 99, and the shoe 105 has an inclined shearing edge 107 (FIG. 4) which engages the cylinder surface 23 immediately after it is engraved by the stylus 45 to remove any burrs which may be produced on the surface by the engraving stylus. By adjusting the angular position of the plate 99, the edge 107 of the shoe 105 may be precisely positioned parallel with the axis of the cylinder 22. The cleaning edge 107 is urged against the cylinder surface 23 by a spring (not shown) connected to the yoke member 95.

As also shown in FIG. 1, the engraving head 20 is supported for tilting movement by a set of leaf springs 110 which connect the engraving head to a support carriage (not shown) supported for both traversing movement parallel to the axis of the cylinder 22 and transverse movement perpendicular to the axis. A flat bar 112 projects rearwardly from the base of the engraving head 20, and the bar 112 is coupled to the carriage by a manually adjustable screw mechanism (not shown) which provides for manually tilting the engraving head to move the guide shoe 80 and stylus 45 into engagement with the cylinder surface 23 by a spring (not shown) under the bar 112. In addition, a rotary cam member 116 is positioned above the bar 112 and is eccentrically mounted on the shaft 117 of a stepping motor 118. When the motor 118 is energized, the engraving head 20 is automatically and slowly moved or tilted to move the guide shoe 80 and stylus 45 into and out of engagement with the cylinder surface 23.

Figure 11:
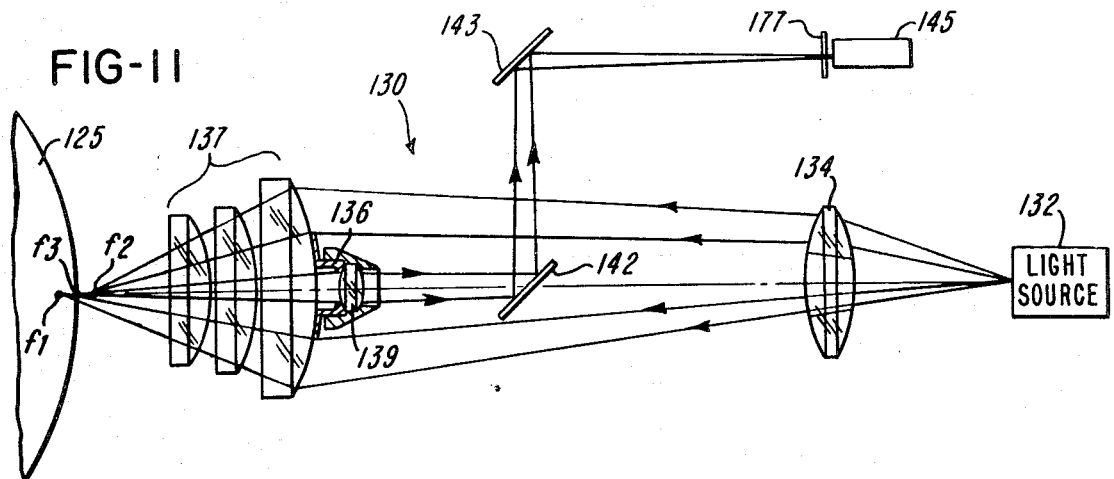
FIG. 11 is a somewhat diagrammatic illustration of the copy illuminating and reading system used within the copy scanning head.

Referring to FIG. 11, the original copy which is to be engraved into the cylinder 22, is mounted on a copy support cylinder 125 supported for rotation at a predetermined constant speed. The copy is scanned by a scanning head (not shown) which includes a copy illuminating and detecting system 130. In the system 130, light rays from a light source 132 project through a center hole within a lens 134 and then past a mask 136 and through a lens system 137 which focuses the light rays at an illumination point f1. The light rays which pass through the lens 134 are deflected so that they are focused at an illumination point f2 which is spaced a small distance from point f1, for example, approximately 0.05 inch.

The copy on the cylinder 125 is located between the illumination points f1 and f2 at a pick-up point f3 which is the focal point of the combination of the lens system 137 and a minor correcting lens 139. The rays passing through the mask 136 and lens 139 are reflected by reflectors 142 and 143 to an optical detector 145. A light shield 177 is used to control the light which enters the detector 145.

By using the two light illumination points f1 and f2 on each side of the normal position of the copy surface f3, the higher illumination intensity at the points f1 and f2 compensates for the falloff of the light reflected to the detector 145 as the copy surface being scanned moves from the point f3 between the illumination points closer to one of the illumination points. Thus the detector does not receive a false reading due to irregularities in the surface of the copy when its supporting cylinder is rotated. As a result, a radial change in the copy surface, for example 0.03 inch, results in a negligible change in the voltage output of the detector 145. While there are several methods of producing the two focus illumination points f1 and f2, the system illustrated in FIG. 12 has produced desirable results by producing extremely small illuminated spots and illumination at an angle which avoids undesirable surface reflection. In addition, the small pickup point f3 is fully illuminated around 360 degrees to assure that a uniform pickup signal is obtained between the illumination points f1 and f2.

As mentioned above, it is highly desirable to obtain accurate control of the cell depth with rapid depth changes and also to provide for producing the maximum number of engraved cells per second. This requires operating the diamond cutting stylus 45 at a frequency which is above the natural frequency of the assembled oscillating components. Thus the response to a depth signal which is at the natural frequency of the engraver system must be multiplied by the "Q" or resonant rise of the oscillating components within the engraving head. The dampening systems discussed above are helpful, but too much dampening and resulting hysteresis would be required to obtain a system which has a flat frequency response through the resonant frequency of the oscillating components.

Figure 12:
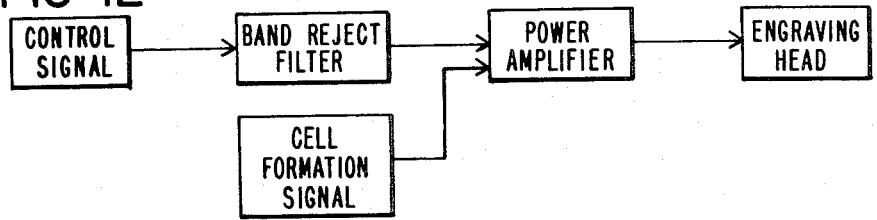
FIG. 12 is a block diagram of the controls for operating the engraving head.

FIG. 12 shows a control system for operating the engraving head above its natural frequency. The control signal, which is derived from the optical detector 145 within the scanner head, is used to engrave cells which have a depth proportional to the signal amplitude, irrespective of the frequency component of the signals. In accordance with the invention, the control signal is passed through a band reject filter which may be of the R, L or C type or it may be of the active filter type. However, it is necessary for the filter to be such that its frequency and "Q" characteristics may be adjusted to reduce the resonant frequency response to the inverse characteristic of the engraving head frequency response. The processed signal is directed along with a cell formation signal to a power amplifier which drives the coils 61 within the engraving head. As a result of the control system, the signal produced by the detector 145 for controlling the diamond stylus is a flat frequency response when it passes through the natural frequency of the assembly of the oscillatory components. One or more additional band reject filters may be used if the harmonic frequencies between the natural frequency and the signal frequency presents a problem.

Figure 13:
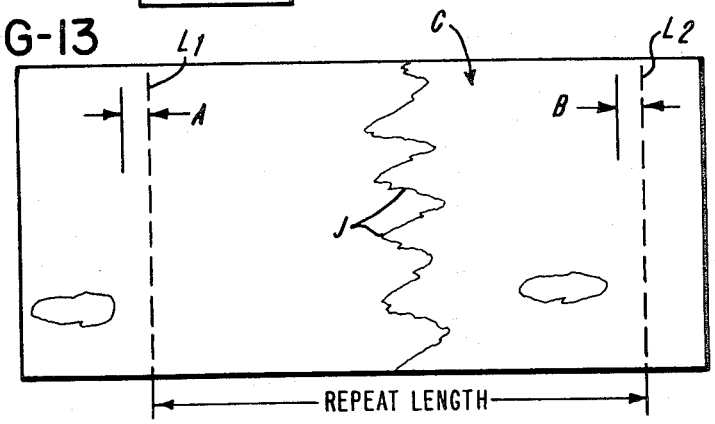
FIG. 13 illustrates a typical copy having a repeat wood grain pattern and showing a typical joint within the pattern.
Figure 14:
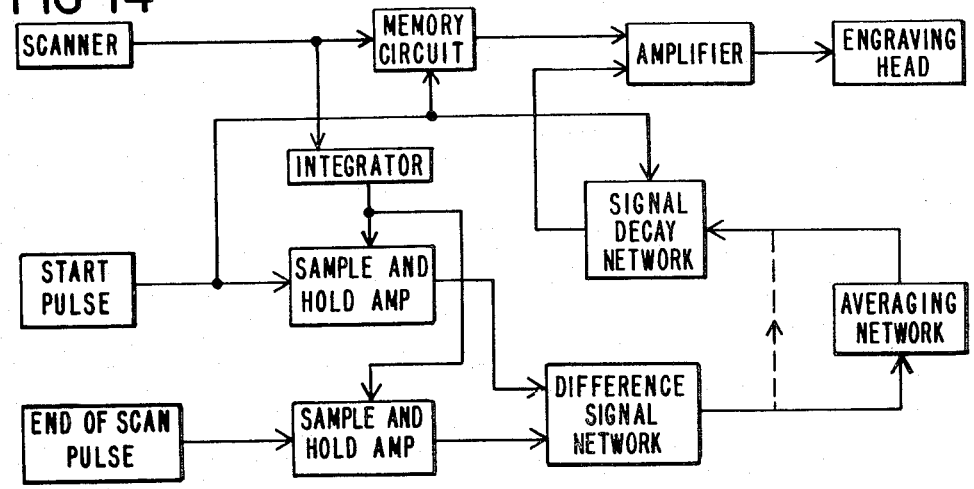
FIG. 14 is a block diagram illustrating the control circuit for the engraving head in order to produce a substantially invisible joint on the engraved cylinder from the copy shown in FIG. 13.

In reference to FIG. 13, the engraving of repeat patterns on a gravure cylinder usually requires the copy to be made so that it is longer than one repeat length. The copy C illustrated in FIG. 14 has a joint J which is manually made to be as invisible as possible. It is desired to engrave the image from line L1 to line L2 around the gravure cylinder in a manner such that an invisible joint is made between lines L1 and L2. Usually, there is a gray scale shift due to the photographic process which makes the copy in the area of line L1 darker or lighter than the copy in the area of line 12. Thus when placed next to each other on the engraved cylinder, the joint of lines L1 and L2 becomes very visible, and it is expensive to correct this problem manually after engraving. This problem is effectively corrected by the control system illustrated in FIG. 14. The scanner scans the entire length of the copy shown in FIG. 13 as the copy is rotated on the copy support or scanner cylinder. The memory circuit remembers at least one signal pick up line from line L1 to L2 and supplies a signal to the amplifier for driving the engraver head so that line L1 is engraved next to line L2.

The scanner signal is fed into an integrator which samples a portion of the line such as the length A which may be from ¼ inch to 1 inch. A start pulse operates to start the memory circuit and to start the engraving cycle and cause the sample and hold amplifier to sample in line length A. At the end of the copy scanned at line L2, a separate signal causes a second sample line length B of the scan line to be sampled by the sample and hold amplifier. Any difference between the two sample signals is fed through an averaging network to a signal decay network. When a start pulse is received by this network, it sends a signal to the amplifier which causes the reading from line L1 on the copy to be increased or decreased to match the signal from line L2 on the copy. Thus the engraving depth for each length just after L1 and just before L2 are made to match.

The signal from the signal decay network decreases as the engraving proceeds from line L1 to line L2 in a gradual manner so that it is not apparent on the engraved surface on the printing cylinder. The gray scale shift from line L1 to line L2 on the copy is normally a large area phenomena. If full correction is taken on a line-by-line basis, there may be too much or too little correction taken which is due to the details in the copy. In such a case, it is desirable to use the averaging network which averages several differential signals over several engraved lines, providing a more accurate area correction for gray scale errors.

It may be desirable for the engraver to operate so that its engraving start (for line L1) is not the same as the start of the scan, the start pulse for the signal decay network would then be the start of the engrave signal. It is apparent that in this case, an engraving start pickup separate from the scanner may be used in this system. In addition, the exact location of the pickup signal may be varied as long as the pickup is representative of differences of intensity or gray in the areas of the two lines to be joined.

While the methods and forms of apparatus herein described constitute preferred embodiments of the invention, it is to be understood that the invention is not limited to the precise methods and forms of apparatus described, and that changes may be made therein without departing from the scope and spirit of the invention as defined in the appended claims.

The invention having thus been described, the following is claimed:

1. Apparatus adapted for engraving the surface of a gravure printing cylinder, comprising an engraving head, means supporting said head for relative movement adjacent the surface, said head including a shaft and an engraving stylus, means on said shaft and supporting said stylus eccentrically of the axis of said shaft, means supporting said shaft and said stylus for oscillation, power operated drive means for oscillating said shaft and said stylus, a copy scanner having a light source, optical means for concentrating light rays on the copy being scanned and for also detecting the light rays reflected by the copy, and said optical means being effective to produce two spaced illumination focal points and a copy pickup focal point spaced between the illumination points.

2. Apparatus as defined in claim 1 wherein said optical means comprise a lens system having an annular portion for producing an illumination focal point and a center portion for producing a copy pickup focal point.

3. Apparatus adapted for engraving the surface of a gravure printing cylinder, comprising an engraving head, means supporting said head for relative movement adjacent the surface, said head including a shaft and an engraving stylus, means on said shaft and supporting said stylus eccentrically of the axis of said shaft, means supporting said shaft and said stylus for oscillation, power operated drive means for oscillating said shaft and said stylus, a copy scanner having a light source and a light detector, optical means including a lens system having an annular portion surrounding a center portion, one of said portions of said lens system cooperating with said light source to concentrate light rays on the copy being scanned, and the other said portion of said lens system cooperating with said light detector for detecting the light rays reflected by the copy.

4. Apparatus as defined in claim 3 and including means for scanning a copy having a repeating pattern adapted to form a joint, means for sensing the copy density at different circumferentially spaced locations on the copy, means for comparing the density at the different locations, means for introducing a correction for differences in density, and means for controlling said drive means to cause the engraving at the joint to be corrected for unbalance in copy density at the locations.

5. Apparatus as defined in claim 3 wherein said optical means are effective to focus the light rays at a plurality of spaced illumination points adjacent the copy.

6. Apparatus as defined in claim 3 wherein said optical means produces two spaced illumination focal points and a copy pickup focal point spaced between the illumination points.

7. Apparatus adapted for engraving the surface of a rotating gravure printing cylinder, comprising an engraving head, means supporting said head for relative movement adjacent the surface, said head including a shaft and an engraving stylus, means on said shaft and supporting said stylus eccentrically of the axis of said shaft, means supporting said shaft and said stylus for oscillation, power operated drive means for continuously oscillating said shaft and said stylus while the printing cylinder is rotating, a copy scanner having a light source and a light detector, optical means for concentrating light rays from said light source onto copy supported by a rotating copy cylinder with the copy having a repeating pattern adapted to form a joint, said optical means directing light rays from the copy to said light detector, means associated with said copy scanner for sensing the copy density at different circumferentially spaced locations on the rotating copy, means for comparing the density at the different locations, means for introducing a correction for differences in copy density, and means for controlling said drive means to cause the engraving at the joint to be corrected for unbalance in copy density at the different locations.

* * * * *